(12) United States Patent
Dosenbach (10) Patent No.: US 12,109,916 B2
(45) Date of Patent: Oct. 8, 2024

(54) CABLE TENSIONED SEATBASE FOR A VEHICLE

(71) Applicant: The Braun Corporation, Winamac, IN (US)

(72) Inventor: Sajed Dosenbach, Indianapolis, IN (US)

(73) Assignee: The Braun Corporation, Carmel, IN (US)

( * ) Notice: Subject to any disclaimer, the term of this patent is extended or adjusted under 35 U.S.C. 154(b) by 287 days.

(21) Appl. No.: 17/670,837

(22) Filed: Feb. 14, 2022

(65) Prior Publication Data
US 2022/0266723 A1    Aug. 25, 2022

Related U.S. Application Data

(60) Provisional application No. 63/151,286, filed on Feb. 19, 2021.

(51) Int. Cl.
*B60N 2/015* (2006.01)
*A61G 3/08* (2006.01)

(52) U.S. Cl.
CPC .......... *B60N 2/0155* (2013.01); *A61G 3/0808* (2013.01); *B60N 2/01591* (2013.01)

(58) Field of Classification Search
CPC .............. B60N 2/0155; B60N 2/01591; B60N 2/01516; B60N 2/245; A61G 3/0808

USPC ........ 296/65.03, 4, 414, 921, 297, 344.1, 11
See application file for complete search history.

(56) References Cited

U.S. PATENT DOCUMENTS 5,577,805 A * 11/1996 Glinter .................. B60N 2/206
296/65.09
2021/0007917 A1   1/2021  Hargraves et al.

OTHER PUBLICATIONS

ISR-WO dated Jun. 27, 2022 for PCT/US22/16294.

* cited by examiner

*Primary Examiner* — Dennis H Pedder
(74) *Attorney, Agent, or Firm* — Daniel Tallitsch (57) ABSTRACT

A seat assembly for a transport vehicle includes a seat base assembly configured to being coupled to a floor of the transport vehicle. The seat base assembly includes a seat and a cable system having a cable and an actuating mechanism operably coupled to the cable. A clamping arm is operatively coupled to the seat base assembly and the cable system. The actuating mechanism operably actuates the cable to move the clamping arm between an unlatched position and a latched position with respect to the floor. In the latched position, the seat base assembly is coupled to the floor, and in the unlatched position, the seat base assembly is decoupled from the floor.

20 Claims, 9 Drawing Sheets

CABLE TENSIONED SEATBASE FOR A VEHICLE

RELATED APPLICATIONS

This application claims the benefit of U.S. Provisional Patent Application Ser. No. 63/151,286, filed Feb. 19, 2021, the disclosure of which is hereby incorporated by reference in its entirety.

FIELD OF THE DISCLOSURE

The present application relates to a passenger vehicle for transporting one or more passengers, and more particularly to a passenger vehicle which is retrofitted for transporting one or more passengers having a physical limitation.

BACKGROUND

Automobile manufacturers do not currently mass-produce passenger vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration a van is retrofitted with a ramp to enable a physically limited individual using a wheelchair to enter the vehicle without the assistance of another person.

Other known products for retrofitting a vehicle, such as a van, include wheel chair lifts, lift platforms, and lowered floor surfaces. In some instances, a door of an original equipment manufacturer (OEM) van is enlarged or otherwise modified to permit entry of the physically limited individual through what is known as the assisted entrance. Once inside the vehicle, individuals who use the assisted entrance are often located in a rear passenger compartment of the van adjacent to or behind the assisted entrance.

While these seating locations provide for the transport of the physically limited individual, such locations do not always lend themselves to providing a physically limited passenger with a seating location in either the driver side or passenger side of the front row of the passenger compartment. Consequently, what is needed is a modification to an OEM vehicle which allows the physically limited individual seated in the front passenger compartment, either as the passenger or as the driver.

SUMMARY

In one embodiment of the present disclosure, a seat assembly for a transport vehicle includes a seat base assembly configured to being coupled to a floor of the transport vehicle, the seat base assembly comprising a seat and a cable system having a cable and an actuating mechanism operably coupled to the cable. A clamping arm is operatively coupled to the seat base assembly and the cable system, wherein the actuating mechanism operably actuates the cable to move the clamping arm between an unlatched position and a latched position with respect to the floor. In the latched position, the seat base assembly is coupled to the floor, whereas in the unlatched position, the seat base assembly is decoupled from the floor.

In one example of this embodiment, the clamping arm includes a plurality of clamping arms, wherein each of the plurality of clamping arms releasably couples the seat base assembly to the floor. In a second example, the cable system includes a plurality of rollers, each of the plurality of rollers configured to support the cable and being pivotally connected to one of the plurality of clamping arms. In a third example, the seat base assembly has a plurality of legs, a first lateral member extending between a first pair of the plurality of legs, a second lateral member extending between a second pair of the plurality of legs, and a cross beam member extending between the first and second lateral members.

In another example, each of the plurality of clamping arms is pivotally coupled to at least one of the first and second lateral member. In yet another example, each one of the plurality of rollers is coupled at one end of one of the plurality of clamping arms. In a further example, the clamping arm has a recess formed at one end thereof such that the recess is configured to contact a structure coupled to the floor in the latched position. In an alternative example, the clamping arm is pivotally coupled to the seat base assembly such that the recess moves into contact with the structure as the clamping arm pivots relative to the seat base assembly.

In another embodiment of the present disclosure, a seat base assembly for being coupled to a modified OEM vehicle having a floor includes a frame assembly comprising a plurality of legs, a cross beam assembly, a plurality of clamping arms, and a cable system having a cable and a lever arm operably connected to the cable. The plurality of clamping arms is operatively coupled to the cable system and pivotally connected to the cross beam assembly. The lever arm operably actuates the cable to move the plurality of clamping arms between a latched position and an unlatched position relative to the floor such that in the latched position, the seat base assembly is securely coupled to the floor, whereas in the unlatched position the seat base assembly is decoupled from the floor.

In one example of this embodiment, each of the plurality of clamping arms includes a first end and a second end, wherein each of the plurality of clamping arms is pivotally coupled to the cross beam assembly at a location between the respective first and second ends. In another example, the cable system has a plurality of rollers where each of the plurality of rollers is coupled at one end of one of the plurality of clamping arms.

In a further embodiment of the present disclosure, a vehicle having an interior for accommodating a physically limited passenger includes a subfloor and a seat base assembly. The seat base assembly includes a seat, a cable system having a cable and a lever arm operably coupled to the cable, and a plurality of clamping arms operatively coupled to the seat base assembly and the cable system. The lever arm operably actuates the cable to move the plurality of clamping arms from an unlatched position to a latched position with vehicle. In the latched position, the seat base assembly is securely coupled to the floor, whereas in the unlatched position the seat base assembly is decoupled from the floor.

In one example of this embodiment, the cable system includes a plurality of rollers, where each of the plurality of rollers configured to support the cable and being pivotally connected to one of the plurality of clamping arms. In a second example, the seat base assembly includes a plurality of legs, a first lateral member extending between a first pair of the plurality of legs, a second lateral member extending between a second pair of the plurality of legs, and a cross beam member extending between the first and second lateral members. In another example, each of the plurality of clamping arms is pivotally coupled to at least one of the first and second lateral member.

In a further example, each one of the plurality of rollers is coupled at one end of one of the plurality of clamping arms. In yet a further example, the clamping arm have a recess formed at one end thereof such that the recess is configured to contact a structure coupled to the floor in the latched position. In an alternative example, the cable may include a single length of cable arranged to include a first section and second section. The first section of the cable is operatively connected to two of the plurality of clamping arms and the second section of the cable is operatively connected to another two of the plurality of clamping arms.

In another example, a first biasing member is coupled between a first clamping arm of the plurality of clamping arms and a support member, and a second biasing member is coupled between a second clamping arm of the plurality of clamping arms and the support member. In this example, the first and second biasing members are configured to bias the first and second clamping arms in their unlatched position.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
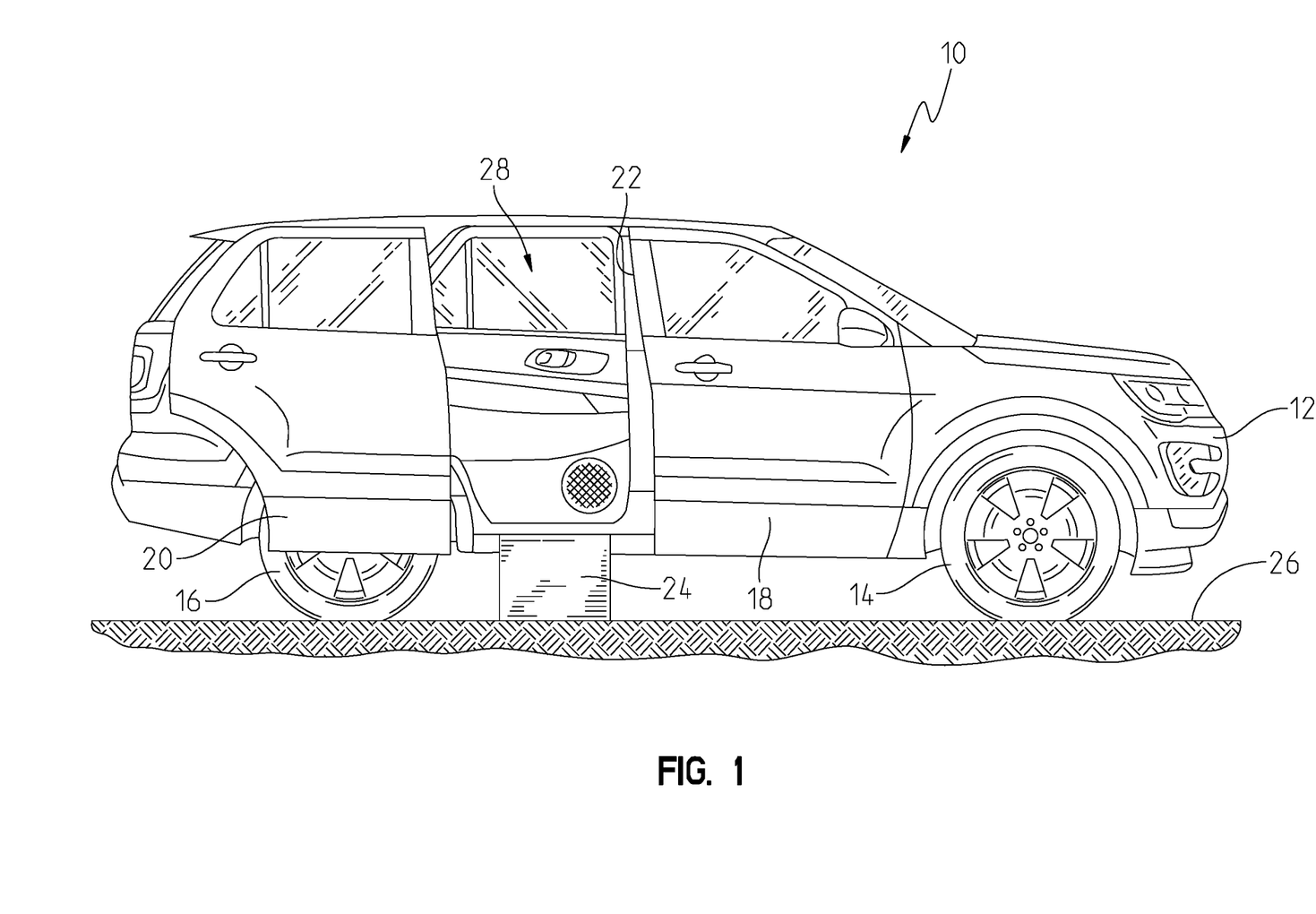
FIG. 1 illustrates an elevational side view of a sport utility vehicle including an access ramp.

FIG. 1 illustrates a sport utility vehicle (SUV) 10 available from any number of United States and foreign manufacturers. In the illustrated embodiment, the SUV, also called a crossover vehicle, includes a unibody construction, but other SUV's having a frame on body construction, are also included in the present disclosure. Consequently, the use of SUV herein includes all types and kinds of sport utility vehicles constructed with a body on frame construction, a unibody construction, or other constructions. In addition, while the SUV is illustrated in FIG. 1, the present disclosure is directed to all passenger vehicles carrying one or more passengers, including vans and sedans.

FIG. 1 illustrates the SUV 10 including a body 12 operatively coupled to front wheels 14 and rear wheels 16. The SUV 10 may include a unibody construction. A first passenger side door 18 may be located between the front wheels 14 and rear wheels 16 and provides access to a passenger for sitting in a front seat of the vehicle adjacent to the driver. In this position, the passenger has a clearer view of the road when compared to sitting in a middle row or back row of seats of the vehicle.

The SUV 10 has been modified to include a second passenger side door 20 coupled to the unibody frame through a mechanical linkage (not shown). In other embodiments, the side door 20 may be coupled to the unibody frame through a sliding mechanism. In this embodiment, the second passenger side door has been modified to slide along a track (not shown), as opposed to the manufacturer supplied door which is hinged to swing away from the vehicle, as is understood by those skilled in the art. In addition to modifying the second passenger side door 20 to slide along the track, an opening 22 to the interior, in some embodiments, may be modified or widened to provide access to a passenger seated in a wheelchair. The opening is defined on the sides thereof by an edge of the second passenger door 20 and the edge of the first passenger door 18. The vehicle may be further modified to include a ramp assembly 24 which provides rolling access of the wheelchair from a ground or surface 26 into an interior 28 of the vehicle 10. To provide sufficient room for the ramp assembly 24 to be carried in the vehicle, the pre-existing floor of the vehicle may be removed and a new floor is installed which is lower than the original or removed floor. The lowered floor of the vehicle may provide a storage location for the ramp assembly 24 and also increases the headspace for a wheelchaired passenger. The ramp assembly 24 may be installed at the opening 22 and is movable between the interior of the vehicle, where it may be stored in some embodiments, and to the exterior for wheelchair access. As used herein, wheelchaired passenger is used to indicate that the individual is making use of a wheelchair, whether that use is temporary or permanent.

In an alternative embodiment, the existing vehicle floor may be lowered rather than replaced.

In known modified vehicles, such as modified vans, the middle row of seats is removed from the manufacturer supplied vehicle to enable access to a wheelchair supporting a passenger. Once the wheelchaired passenger moves into the interior of the vehicle, the passenger or caregiver locates the wheelchair in the middle portion of the interior behind the driver and passenger seats of the front row. While the wheelchaired passenger is readily and safely transported by the vehicle, when located at this position, the passenger can have difficulty communicating with the driver and difficulty viewing the road and surrounding scenery. This location is therefore often frustrating for many individuals, particularly those individuals who led active lives prior to becoming disabled and who continue to be active.

Figure 2:
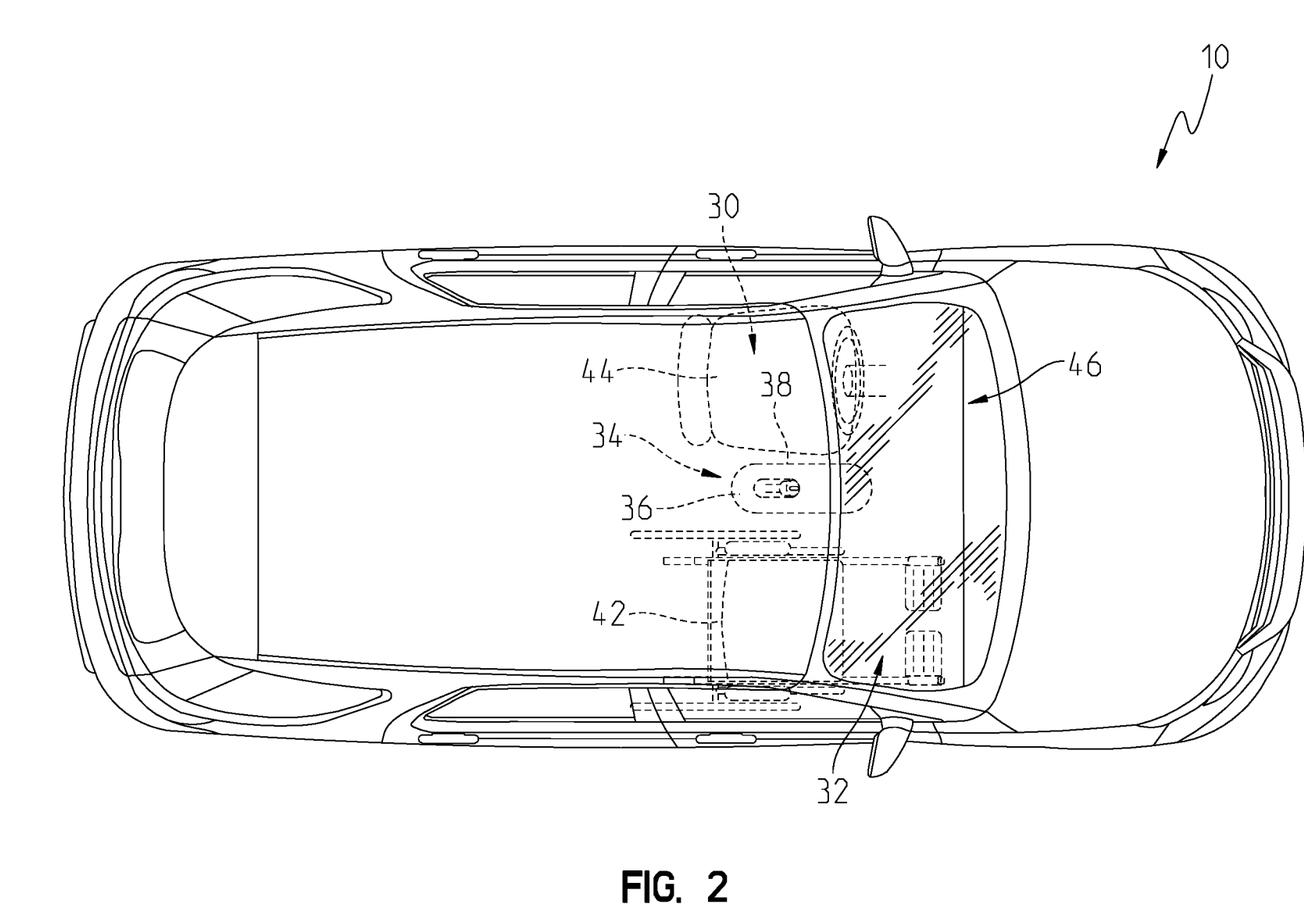
FIG. 2 illustrates a top plan view of a sport utility vehicle.

To accommodate more wheelchaired passengers, the SUV has become a desirable vehicle of choice, particularly with military veterans who have disabilities from their tours of duty. Consequently, the SUV 10 is further modified or retrofitted as illustrated in FIG. 2 to provide a location for the wheelchaired passenger to be located in the front passenger compartment at either a driver side location 30 or a passenger side location 32, adjacent to the driver side location 30. To retrofit the vehicle 10, a manufactured SUV may be purchased from a dealer or directly from the manufacturer.

As shown in FIG. 2, the driver side location 30 and the passenger side location 32 may be located in a front passenger compartment on either side of a shifter assembly 34, which may include a center console 36 and a shifter 38.

The vehicle 10 may be further retrofitted, in one embodiment, to enable both the driver side location 30 and the passenger side location 32 to include either a wheelchair 42 or a seat 44. In the event a seat 44 is desired in one of the locations 30 and 32, a seat assembly 50 of FIG. 3 may be placed in a recessed area 52 of one of the locations 30 and 32. The seat assembly 50, in other embodiments, may be located in both positions. Because the seat assembly 50 replaces an OEM seat and is also removable to enable an OEM seat to be reinstalled, the seat assembly 50 enables the OEM vehicle to accommodate passengers with physical limitations, while passengers without physical limitations may still operate or be seated in the vehicle.

Figure 3:
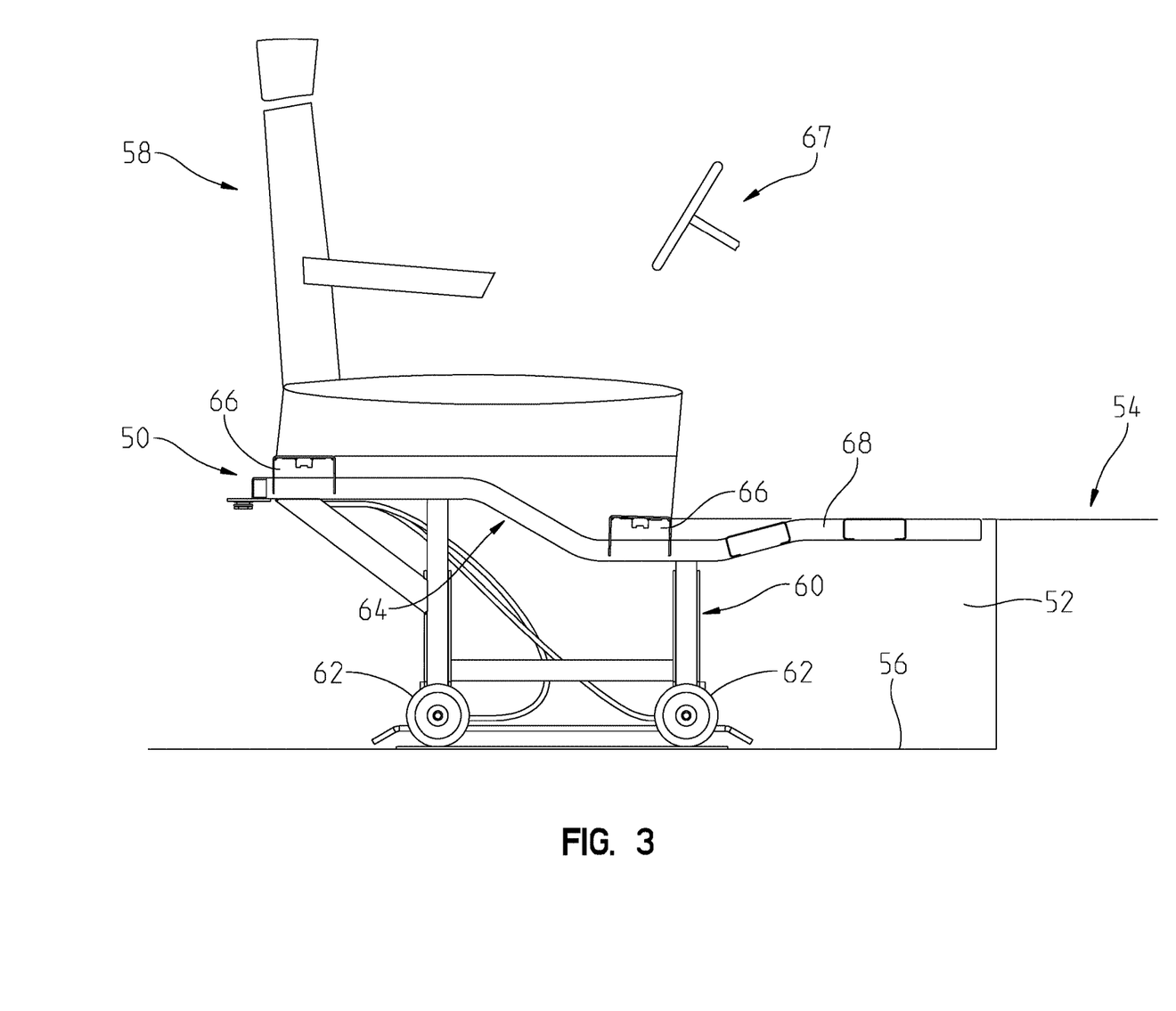
FIG. 3 illustrates a seat assembly.

The recessed area 52 may be formed during the retrofit of the vehicle to lower or to modify a front portion 46 of a floor 54 of the vehicle 10 to provide a lowered floor 56, i.e., a subfloor 56. Each of the driver side location 30 and the passenger side location 32 includes the recessed area in one embodiment. In other embodiments, however, one recessed area 52 is located at one of the driver side location 30 and the passenger side location 32, but not the other. In a further embodiment, each of the drive side location and passenger side location 32 may include its own, independent recessed area 52. The seat assembly 50 supports a seat 58, for example, an OEM seat. In some embodiments, the seat 58 may be a custom seat or an aftermarket seat. In other embodiment, the seat assembly 50 may be connected to floor 54, if no subfloor is provided.

The seat assembly 50 may include a seat base assembly 60 including wheels 62 that enable the seat assembly 50 to be moved into the recessed area 52. In some embodiments, the wheels 60 are replaced by sliders or couplers. The seat base assembly 60 may include a seat base 64 configured to support the seat 58 on mounting brackets 66 coupled to the seat base 64. A portion 68, e.g., a floor extension, of the seat base 64 may extend away from the seat 58 toward a front of the vehicle 10. In FIG. 3, the seat 58 may be located at the driver's side position 30 to enable a user to drive the vehicle with a steering wheel 67. Other types of vehicles are contemplated such as those without steering wheels, such as those vehicles including steering toggle or paddles, or semi-autonomous or autonomous vehicles lacking driver controlled steering devices. The floor extension 68 may support a plate or flooring (not shown) that extends to the floor 54, such that the recessed area 52 may be at least partially or fully covered in front of the seat 58. The leg extension 68 may provide support for a level surface extending from the floor 54 to support a passenger's feet or to provide a floor location upon which belongings of a passenger can be placed.

Figure 4:
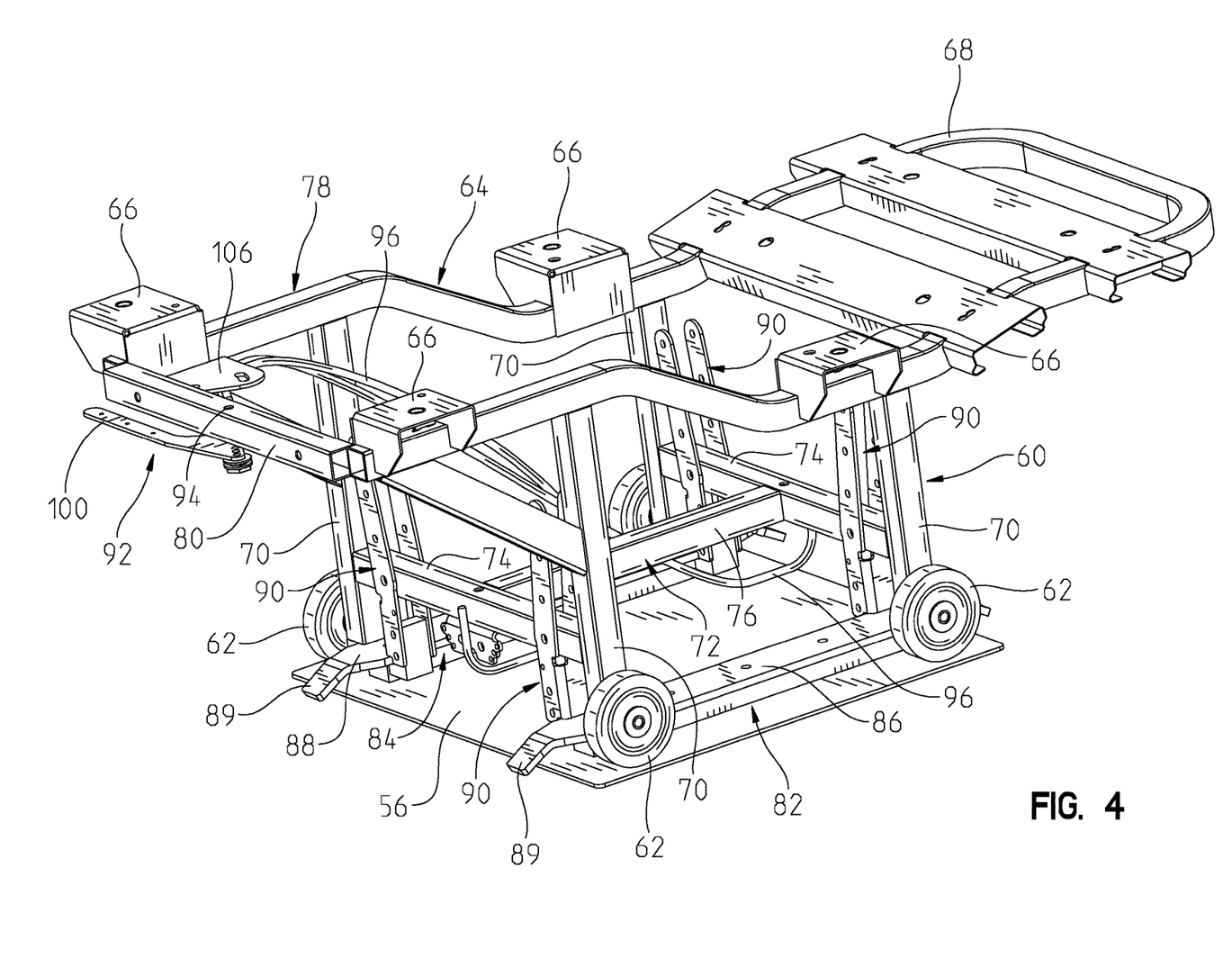
FIG. 4 illustrates a seat base assembly for the seat assembly of FIG. 3.

FIG. 4 illustrates a perspective view of the seat assembly 50 coupled to a portion of the subfloor 56. The seat base assembly 60 may include upstanding frame parts 70, e.g., legs, extending from each of the wheels 62 located at one end of a corresponding frame part 70. The other ends of the legs 70 may be fixedly connected to the seat base 64. Alternatively, the legs 70 may be adjustably coupled to the seat base 64. A cross beam structure 72 may extend between each of the upstanding frame parts or legs 70 to provide support for the seat base assembly 60. In one embodiment, the cross beam structure 72 may include lateral parts or members 74 extending between legs 70 and a middle support 76 extending between the lateral parts 74. The leg extension 68 may extend from the legs 70 located on one side of the seat base assembly 60. A seat base extension 78 may extend from the legs 70 located on another side of the seat base assembly 60. A lateral support 80 may extend between sides of the seat base extension 78. Each of the mounting brackets 66 may be coupled to the frame structure of the seat base 64.

The subfloor 56 may support and may be coupled (e.g., adjustably or fixedly) to a first standoff 82 and a second standoff 84. Each of the standoffs 82 and 84 may be connected to and respectfully support longitudinally extending (with respect to the length of the vehicle) engagement plates 86 and 88. The plates 86 and 88 may be configured to receive clamping arms 90 located at or near each of the four corners of the seat base assembly 60, as generally defined at or near each of the legs 70. In the illustrated embodiment, the clamping arms 90 are pivotally coupled to the cross beam structure 72. In other embodiments, the clamping arms 90 may be pivotally coupled to the legs 70.

Figure 8:
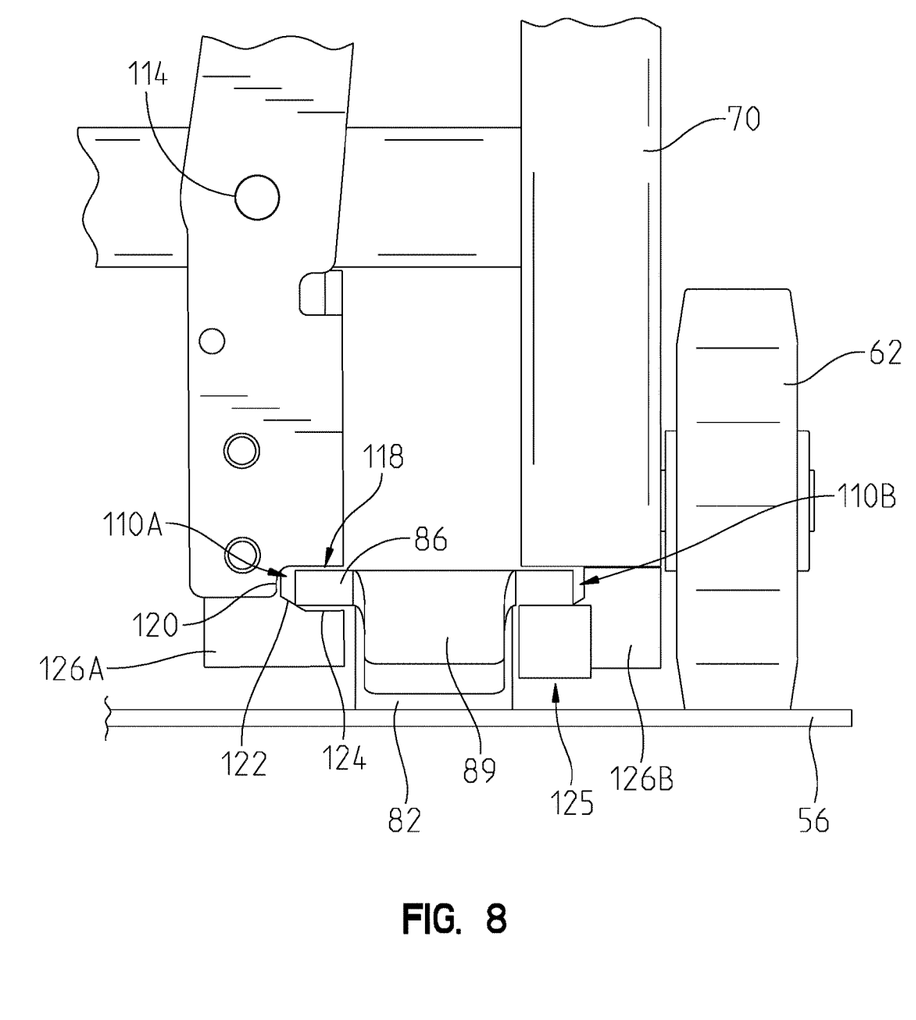
FIG. 8 illustrates a clamping arm of a seat base assembly engaged to a standoff extending from a floor.

In some embodiments, the plates 86 and 88 may include a generally rectangular profile when viewed from an end, such as in FIG. 8. A downwardly extending tab 89 provides terminating ends of the plates 86 and 88. While the seat base assembly 60 is shown having a generally rectangular-shaped cross-section configuration, other configurations are contemplated including with different heights, widths, and lengths selected to fit within the recess area 52 or in a different sized recess area. Also, while wheels are described, other types of parts may be used to enable movement of the seat base assembly 60 along a floor, such as sliders or tracks. In some embodiments, the subfloor 56 may include other types of connectors to which the clamping arms 90 engage. In some embodiments, connectors may be recessed in the subfloor 56 and have a receiving part, e.g., a pin, configured to receive the clamping arm 90.

An actuating lever 92 may be pivotally coupled to the lateral support 80 at a pivot 94. The actuating lever 92 may be operatively connected to a cable system 95 (see, e.g., FIGS. 7, 9, and 10) including a cable 96 operatively connecting the actuating lever 92 to each of the clamping arms 90. Adjusting the position of the actuating lever 92, with respect to the lateral support 80, engages the clamping arms 90 to the engagement plates 86 and 88 and releases the clamping arms 90 from the plates 86 and 88. In one embodiment, a retaining latch (not shown) may be coupled to the actuating lever 92 to reduce the likelihood of the actuating lever 92 moving to an unlatched position. In other embodiments, the lever 92 may be an actuating mechanism such as a button, switch, etc.

Figure 5:
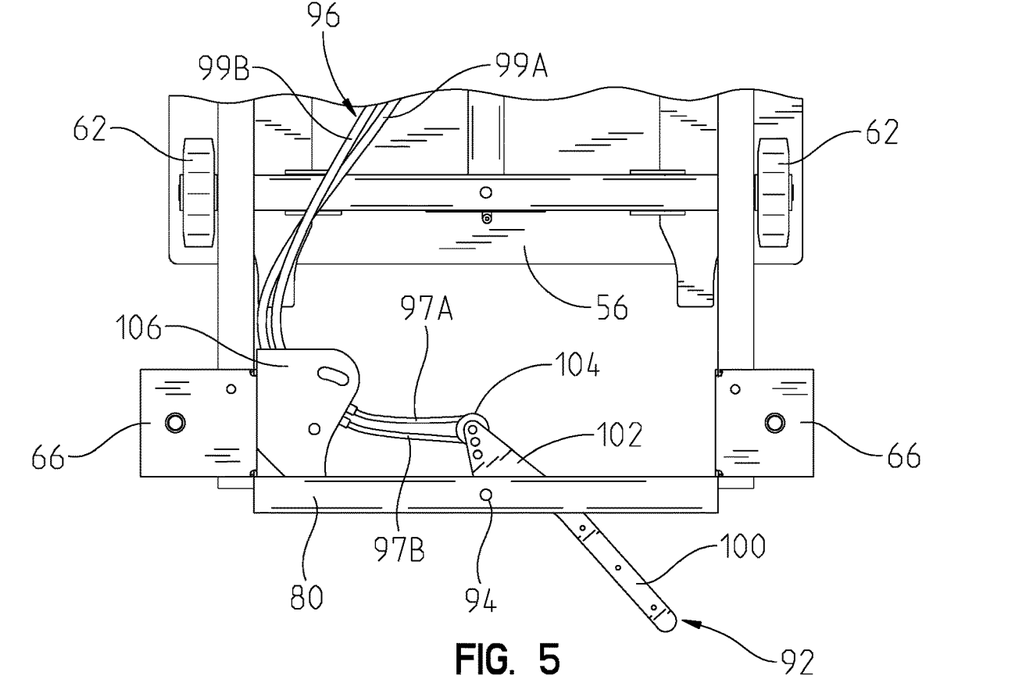
FIG. 5 illustrates illustrate a top down view of rear portion of the seat base assembly with an actuating lever in an open position.
Figure 6:
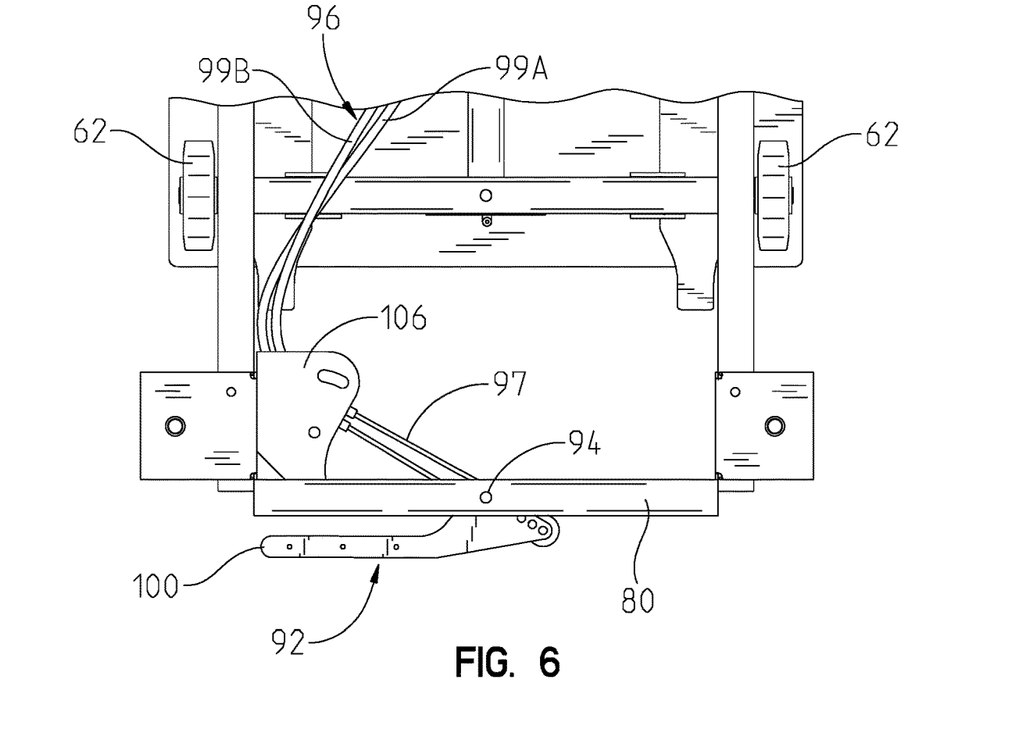
FIG. 6 illustrates illustrate a top down view of rear portion of the seat base assembly with an actuating lever in a closed position.

FIGS. 5 and 6 illustrate a top down view of a rear portion of the seat base assembly 60. In this configuration, the rear portion is located toward the back of the vehicle 10. With this location, the actuating lever 92 may be accessible to an individual who locates the seat base assembly 60 in the vehicle but is not accessible to an individual seated in the seat 58. In FIG. 5, the actuating lever 92 is located in a first position, e.g., an open position, in which the clamping arms 90 are released from the standoffs 82 and 84. In this location, the seat base assembly 60 may be movable into a latching position or is removable from a latching position. In FIG. 6, the actuating lever 92 is located in a second position, e.g., a closed position, in which the clamping arms 90 are latched to the standoffs 82 and 84. In this position, the seat base assembly 60 may be adjustably or fixedly connected to the standoffs 82 and 84 to maintain the seat base assembly 60, and therefore the seat 58 in a substantially fixed location.

The actuating lever 92 is pivotally connected to the lateral support 80 at a pivot or pivot pin 98 extending through the actuating lever 92 and the lateral support 80. A first end 100 of the actuating lever 92 may provide a grasping location or handle for a user to move the actuating lever 92 between the closed and open positions. The pivot 94 may be located between the first end 100 and a second end 102 of the actuating lever 92 such that movement of the actuating lever moves a roller 104 closer to or further away from a cable support 106 connected to the lateral support 80 and the seat base extension 78. The actuating lever 92 may adjust a tension of the cable 96 such that the clamping arms 90 are moved toward or away from the standoffs 82 and 84 for latching and unlatching the seat base assembly 60 to the subfloor 56.

Figure 7:
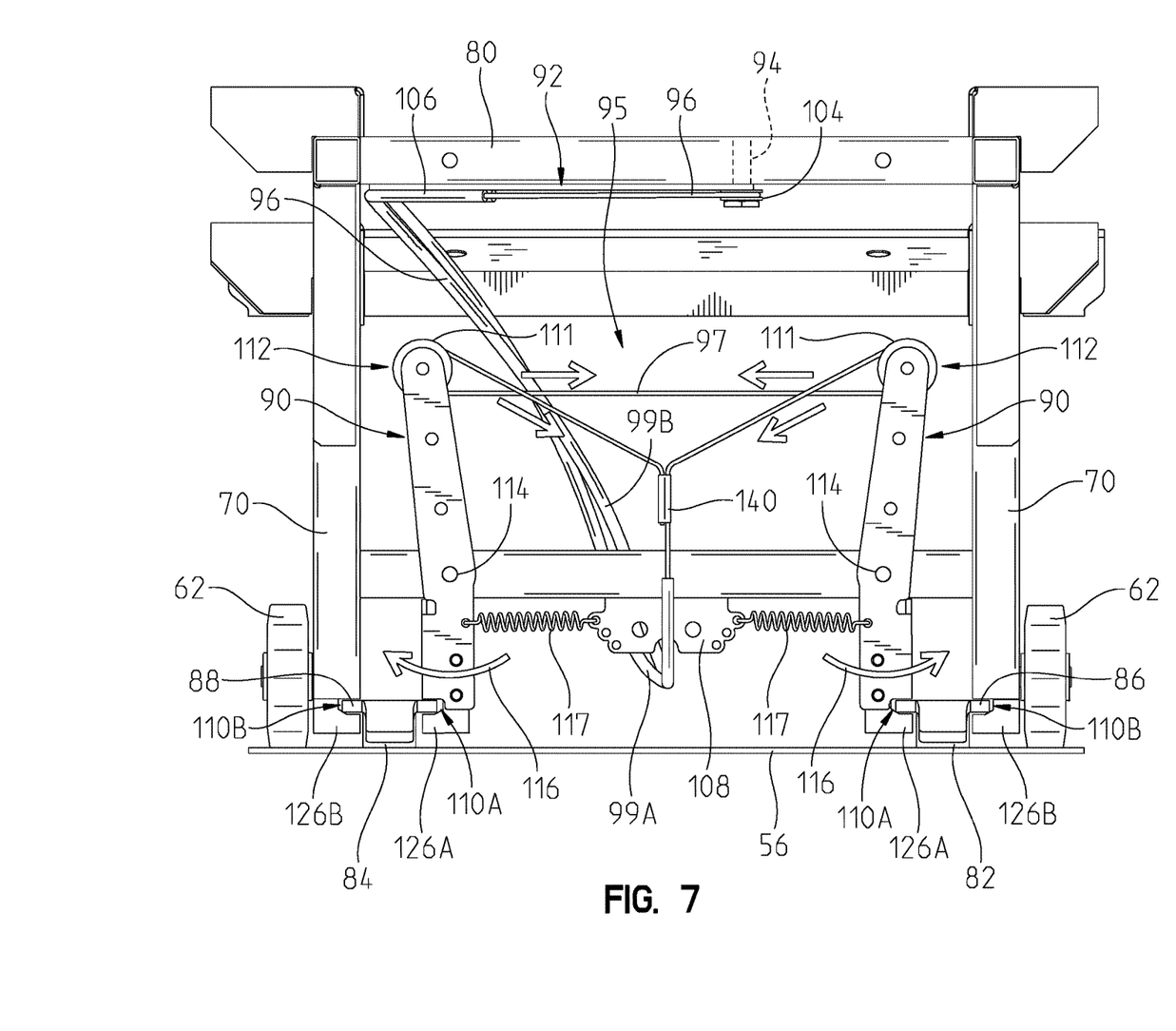
FIG. 7 illustrates a rear end view of a seat base assembly in a latched position.

FIG. 7 illustrates a rear end view of the seat base assembly 60 in a latched position. Each of the clamping arms 90 are clamped to the standoffs 82 and 84. The clamping arms 90 may include a connecting portion 110A, e.g., a notch, indentation, recess, or aperture, that engages a respective standoff 86 and 88. The legs 70 also include a connecting portion 110B similarly configured as connecting portion 110A. Consequently, the standoffs 82 and 84 may be captured by connecting portions 110B of the legs and the connecting portions 110A of the clamping arms 90 to secure the seat base assembly 60 to the floor. See also FIGS. 8 and 9. The cable 96 may include a wire rope or cable 97, that slidingly moves through a sleeve 99 and which is routed about the roller 104. The cable wire rope 97 may be a single length of rope and includes a first section 97A and a second section 97B each of which extends from the roller 104 through a first sleeve 99A and a second sleeve 99B as seen in FIG. 5.

The sleeve 99A may be held in place by a support block 108. The cable wire rope 97 extends from the support block 108 and wraps around arm rollers 111 (see FIG. 10), located at ends 112 respectively of each of the arms 90. When the actuating lever 92 moves from the open position to the closed position, the wire rope 97 may be pulled taut which in turn rotates each of the arms 90 about a pivot 114 in pivot directions 116. A spring 117 may be connected between each of the arms 90 and the support block 108. The spring 117 may resist movement of the arms 90 in the directions 116 such that when the tension on the cable 96 is released by moving the actuating lever 92 to the position of FIG. 5, the springs 117 may pull the arms 90 away from the standoffs 82 and 84 to unlock the seat base assembly 60 from the floor 56.

As shown in FIG. 8, the connecting portion 110A, e.g., a recess, a notch, or an indentation, of the clamping arm 90 may include a first generally horizontal and flat portion 118, a second generally vertical and flat portion 120, an angle portion 122, i.e., a ramp portion, and a third generally horizontal and flat portion 124 which is generally parallel to the first portion 118. The angle portion 122 may provide a standoff engaging surface. As the connecting portion 110A is moved toward one of the plates 86 or 88, the tension in the cable 96 moves the ramp portion 122 in contact with the generally rectangular edges of the plates such that the plates 86, 88 may be cinched to the notches 110A and 110B to provide a relatively tight fit to fix the seat base assembly 60 to the subfloor 56. As the arms 90 move towards the plates, the angled portion 122 can force the first portion 118 toward the plates 86, 88 to provide a tight fit or engagement between the connecting portion 110 and the standoffs. In some embodiments, the connecting portion 110 may include an extending part and the standoffs 82 or 84 may include a recessed part configured to receive the extending part. In some embodiments, a stop feature 125 may be connected to one or more of the standoffs 82 to prevent the seat base assembly 60 from moving forward toward the front of the vehicle. The stop feature 125 may also be located at a predetermined location on the standoffs to insure that the seat assembly 50 is properly located. The stop feature 125, in other embodiments, may include a metallic or semi-metallic part, such as a block, having rectangular or square sides, for example, extending downwardly from a bottom surface of the plate 86. A second stop feature 125 can also be coupled to the remaining standoff. In further embodiments, the connecting portion 110A may comprise other shapes and surfaces.

Figure 9:
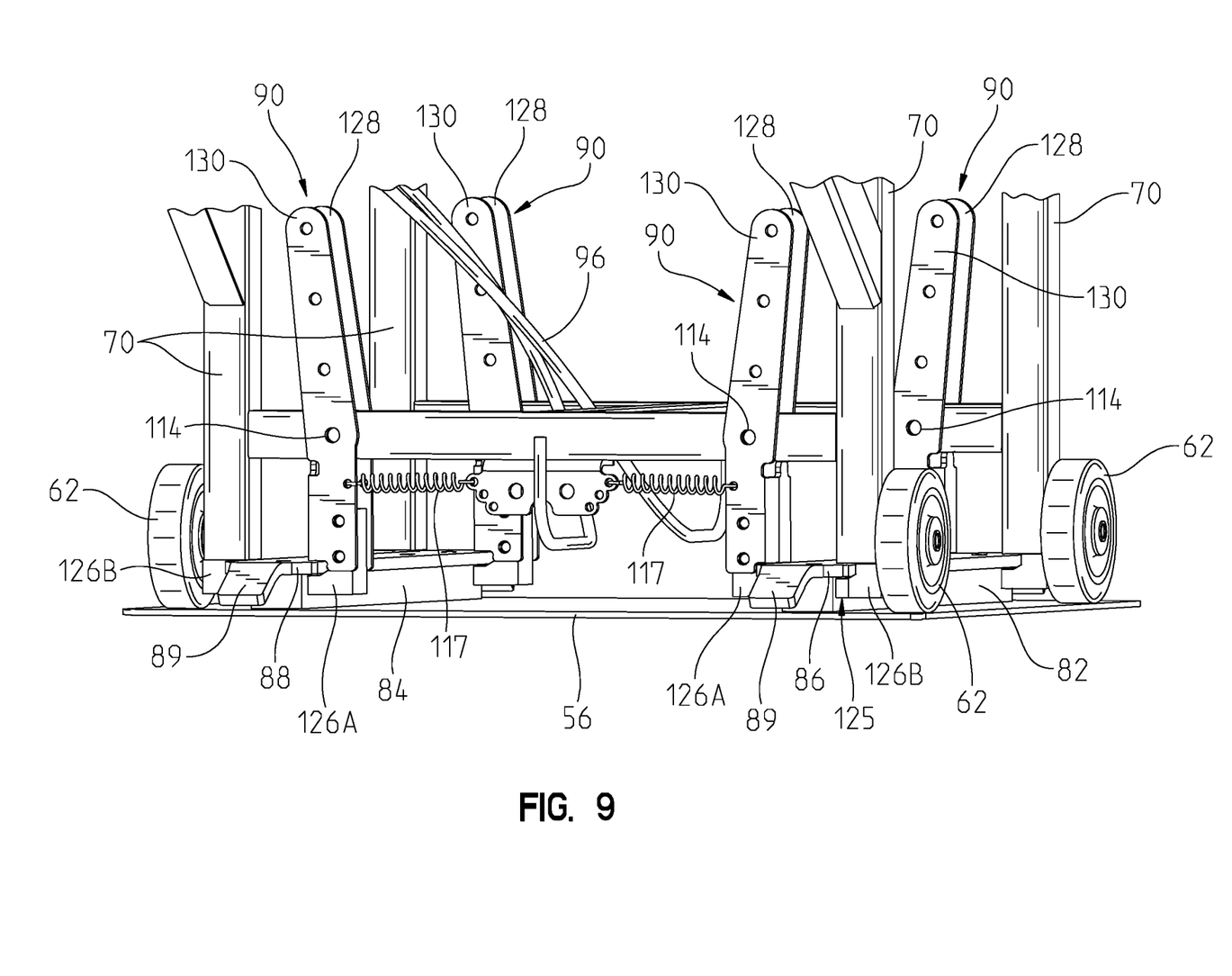
FIG. 9 illustrates a rear perspective view of a portion of a seat base assembly and clamping arms engaged to standoffs extending from a floor.

As shown in FIG. 9, the connecting portion 110A may be located in a block 126A which is held in place by the arms 90. To hold the block 126 in place each of the arms 90 may include a first bar 128 spaced from a second bar 130. A block 126B may be located in the arms 70 to define the connecting portion 110B. In one embodiment, the blocks 126A and 126B may be made of a metal such as steel, copper, or brass. Other metals or materials including plastic may also be used. The blocks 126 may be held in place by a plurality of connectors (not shown).

Figure 10:
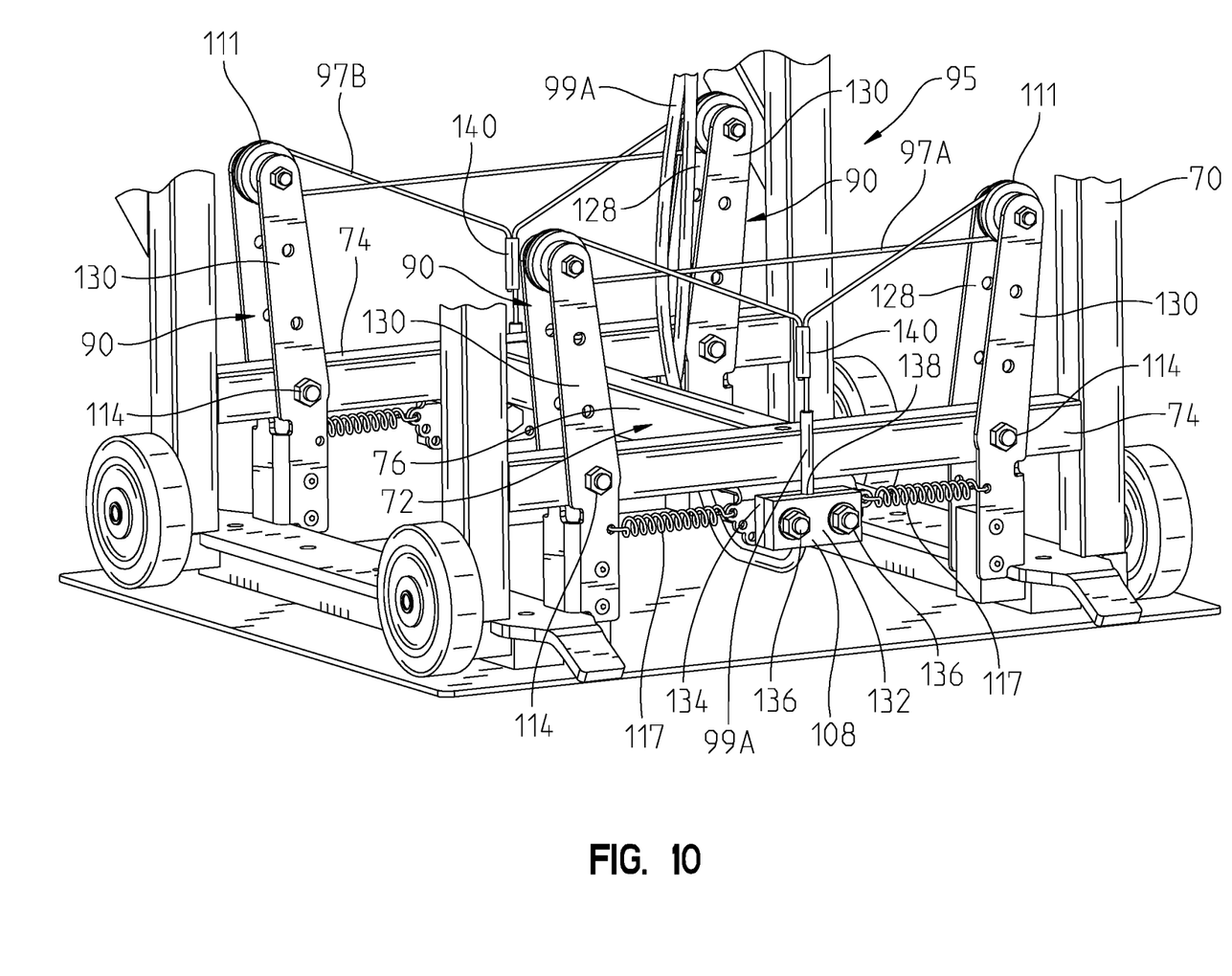
FIG. 10 illustrates perspective view of a cable linkage coupled to clamp arms of a seat base assembly.

As shown in FIG. 10, the support block 108 may be a block having a first part 132 and a second part 134. In one embodiment, the support block 108 may be a rectangular box. In other embodiments, the support block 108 may be shaped substantially like a cube. The first part 132 and the second part 134 may be held together by first and second couplers 136 to define a channel 138 that extends through the support block 108.

The sleeve 99A of the cable 96 may be held in place at the channel 138 of the support block 108 and the wire cable 97 may be free to move within the sleeve 99A. The wire cable 97 has two terminating ends, each of which is held in place by one of the connectors 140 of FIG. 10. Consequently, one end of the first section 97A of wire cable 96 is routed through the sleeve 99A, through the connector 140, around each of the rollers 111, and back through the connector 140 where it is held in place by the connector 140. When the actuating lever 92 is closed, each end of the wire cable 97 may be pulled taut which pulls each of the connectors 140 toward its respective support block 108. The wire cable 97 consequently moves the arms 90 toward the standoffs 82 and 84. In one embodiment, the wire cable 97 is a single length of wire cable 96 having first and second sections 97A and 97B. In other embodiments, a plurality of wire cables 97 may be used.

Each end of the wire cable 97 may be looped around the rollers 111 such that the notches at each arm 96 are pulled toward the standoffs. In one embodiment, the rollers 111 may include a channel or are each eccentric cams. When the actuating lever 92 is moved to the closed position, the eccentricity of the cams may provide a tactile feel to the user at the closed position to indicate that the arms 90 have been "locked" to the standoffs.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A seat assembly for a transport vehicle, comprising:
a seat base assembly configured to being coupled to a floor of the transport vehicle, the seat base assembly comprising a seat;
a cable system comprising a cable and an actuating mechanism operably coupled to the cable;
a clamping arm operatively coupled to the seat base assembly and the cable system, wherein the clamping arm is moveable between an unlatched position and a latched position with respect to the floor;
a biasing member operatively coupled to the clamping arm to bias the clamping arm in the unlatched position, whereby the actuating mechanism is configured to apply a tension to the cable to move the clamping arm from the unlatched position to the latched position, and whereby the actuating mechanism is configured to release the tension to move the clamping arm from the latched position to the unlatched position;
wherein, in the latched position, the seat base assembly is coupled to the floor;
wherein, in the unlatched position, the seat base assembly is decoupled from the floor.

2. The seat assembly of claim 1, wherein the clamping arm comprises a plurality of clamping arms, wherein each of the plurality of clamping arms releasably couples the seat base assembly to the floor.

3. The seat assembly of claim 2, wherein the cable system comprises a plurality of rollers, each of the plurality of rollers configured to support the cable and being pivotally connected to one of the plurality of clamping arms.

4. The seat assembly of claim 3, wherein the seat base assembly comprises:
a plurality of legs;
a first lateral member extending between a first pair of the plurality of legs;
a second lateral member extending between a second pair of the plurality of legs; and
a cross beam member extending between the first and second lateral members.

5. The seat assembly of claim 4, wherein each of the plurality of clamping arms is pivotally coupled to at least one of the first and second lateral member.

6. The seat assembly of claim 3, wherein each one of the plurality of rollers is coupled at one end of one of the plurality of clamping arms.

7. The seat assembly of claim 1, wherein the clamping arm comprises a recess formed at one end thereof, the recess configured to contact a structure coupled to the floor in the latched position.

8. The seat assembly of claim 7 wherein the clamping arm is pivotally coupled to the seat base assembly, the recess moving into contact with the structure as the clamping arm pivots relative to the seat base assembly.

9. A seat base assembly for being coupled to a modified OEM vehicle having
a floor, the seat base assembly comprising:
a frame assembly comprising a plurality of legs, a cross beam assembly, and a plurality of clamping arms; and
a cable system comprising a cable and a lever arm operably connected to the cable;
wherein, the plurality of clamping arms are operatively coupled to the cable system, pivotally connected to the cross beam assembly, and moveable between an unlatched position and a latched position relative to the floor;
a biasing member operatively coupled to the clamping arm to bias the clamping arm in the unlatched position, whereby the lever arm is configured to apply a tension to the cable to move the clamping arm from the unlatched position to the latched position, and whereby the lever arm is configured to release the tension to move the clamping arm from the latched position to the unlatched position;
wherein, in the latched position, the seat base assembly is securely coupled to the floor;
wherein, in the unlatched position, the seat base assembly is decoupled from the floor.

10. The seat base assembly of claim 9, wherein
each one of the plurality of clamping arms comprises a first end and a second end, wherein each of the plurality of clamping arms is pivotally coupled to the cross beam assembly at a location between the respective first and second ends.

11. The seat base assembly of claim 10 wherein:
the cable system comprises a plurality of rollers;
each one of the plurality of rollers is coupled at one end of one of the plurality of clamping arms.

12. A vehicle having an interior for accommodating a physically limited passenger, comprising:
a floor;
a seat base assembly;
a seat supported by the seat base assembly;
a cable system comprising a cable and a lever arm operably coupled to the cable;
a plurality of clamping arms operatively coupled to the seat base assembly and the cable system, wherein the plurality of clamping arms are moveable between an unlatched position and a latched position with respect to the vehicle;
a biasing member operatively coupled to the clamping arm to bias the clamping arm in an unlatched position, whereby the lever arm is configured to apply a tension to the cable to move the plurality of clamping arms from the unlatched position to the latched position, and whereby the lever arm is configured to release the tension to move the plurality of clamping arms from the latched position to the unlatched position;
wherein, in the latched position, the seat base assembly is securely coupled to the floor;
wherein, in the unlatched position, the seat base assembly is decoupled from the floor.

13. The vehicle of claim 12, wherein the cable system comprises a plurality of rollers, each of the plurality of rollers configured to support the cable and being pivotally connected to one of the plurality of clamping arms.

14. The vehicle of claim 13, wherein the seat base assembly comprises:
a plurality of legs;
a first lateral member extending between a first pair of the plurality of legs;
a second lateral member extending between a second pair of the plurality of legs; and
a cross beam member extending between the first and second lateral members.

15. The vehicle of claim 13, wherein each of the plurality of clamping arms is pivotally coupled to at least one of the first and second lateral member.

16. The vehicle of claim 13, wherein each one of the plurality of rollers is coupled at one end of one of the plurality of clamping arms.

17. The vehicle of claim 12, wherein the clamping arm comprises a recess formed at one end thereof, the recess configured to contact a structure coupled to the floor in the latched position.

18. The vehicle of claim 12, wherein the cable comprises a single length of cable arranged to include a first section and second section.

19. The vehicle of claim 18, wherein the first section of the cable is operatively connected to two of the plurality of clamping arms and the second section of the cable is operatively connected to another two of the plurality of clamping arms.

20. The vehicle of claim 12, wherein the biasing member comprises:
- a first biasing member coupled between a first clamping arm of the plurality of clamping arms and a support member; and
- a second biasing member coupled between a second clamping arm of the plurality of clamping arms and the support member;
- wherein the first and second biasing members are configured to bias the first and second clamping arms in their unlatched position.

* * * * *